United States Patent Office 3,216,928
Patented Nov. 9, 1965

3,216,928
SEPARATION OF HYDROCARBON STREAMS BY USE OF SOLVENT-SWOLLEN POLYMERS
Joseph F. Paulson, Claymont, Del., assignor to Sun Oil Company, Philadelphia, Pa., a corporation of New Jersey
No Drawing. Filed Jan. 18, 1962, Ser. No. 167,179
4 Claims. (Cl. 208—310)

This invention relates to the separation of naphthenes and other low-viscosity-index materials from mineral oils of lubricating oil viscosity by preferential sorption with a solid sorbent. More particularly, it relates to a cyclic process for recovering relatively high-viscosity-index components from a lubricating oil fraction using solvent-swollen polymers as the sorbent.

Cyclic adsorption processes for the fractionation of complex mixtures of hydrocarbons into an adsorbate and a percolate of different chemical characteristics are well known in the art. In the simplest embodiment of a process for separating such liquid mixtures, a two-stage (or two-cycle) cyclic process is employed. In the first stage, a liquid feed is contacted with a solid adsorbent in an adsorption zone to separate an adsorbate and a percolate. In the second stage, the adsorbate is removed from the adsorbent, and the adsorbent is regenerated for reuse.

In the prior art, it is disclosed that, in general, the saturated components (the paraffins and naphthenes) of a lubricating oil fraction are the high-viscosity-index (V.I.) components and that the aromatic components are the low V.I. components. Therefore, the prior art cyclic adsorption processes are directed for the most part at removing aromatics from mineral oils of lubricating viscosity in order to increase the V.I. of the oil. Usually the solid adsorbent is selected from silica gel, activated charcoal, molecular sieves, etc.

Further, the prior art discloses that certain of the saturated components (paraffins) have higher V.I. than other saturated components (condensed naphthenes). Thus, a practical method of separating the paraffins from naphthenes would be desirable.

It has now been found that the certain desirable components of the saturated fraction of a lubricating oil fraction can be segregated from the undesirable saturates by the use of a novel solid sorbent.

Accordingly, the process of the present invention comprises subjecting in cyclic fashion a mineral oil of lubricating oil viscosity to treatment with a novel solid sorbent and recovering therefrom paraffinic-type hydrocarbons as a first effluent stream and recovering therefrom condensed naphthenic-type hydrocrabons as a second effluent stream. In addition, the invention also involves a process for producing a high-viscosity-index lubricating oil in which a mineral oil of lubricating oil viscosity containing paraffinic, single-, and condensed-ring naphthenes, and aromatic hydrocarbons is separated into a first fraction containing predominantly saturated components and a second fraction containing predominantly aromatic components. The invention particularly resides in subjecting this first fraction to treatment with a solid sorbent whereby paraffinic and single-ring naphthenic hydrocarbons are concentrated in one fraction, and the condensed-ring naphthenic hydrocarbons are concentrated in another fraction.

In its broad general embodiment, the invention may be practiced such that mineral oil of lubricating oil viscosity is separated into saturated components and aromatic components by subjecting the mineral oil to contact with a bed of, say, silica gel, whereby the aromatic components are preferentially sorbed with the saturated components being substantially unsorbed. After recovery of the saturated components, the aromatic components are also recovered by desorption from the silica gel using methods well known in the art.

The saturated lubricating oil fractions recovered from the silica gel treatment, or from any other source whatsoever, which usually contain paraffinic-type hydrocarbons, condensed-ring naphthenic-type hydrocarbons, and single-ring naphthenic-type hydrocarbons, are then charged in cyclic fashion into a foraminous bed of solvent-swollen-polymer rubber sorbent whereby the condensed-ring naphthenic-type hydrocarbons are preferentially sorbed with the paraffins and single-ring naphthenes being relatively unsorbed. After recovery of the fraction containing the paraffins and single-ring naphthenes, the condensed-ring naphthenes are recovered by desorption using a solvent as elutant. The process sequence is then repeated.

The invention is particularly applicable to mineral oil obtained from dewaxed and deasphalted lubricating oil distillates. In addition, it can be used to improve the viscosity index of lubricating oil raffinate fractions obtained by selective solvent extraction, e.g., extraction with sulfur dioxide, furfural, phenol, or the like, or by the well-known Duo Sol process using propane and cresylic acids. Generally, the invention can be employed for refining distillates having a boiling range in excess of 300° F., for example, from about 300° F. to 1,200° F., but is preferably employed for refining mineral oil fractions boiling within the range of 700° F. to 900° F.

The invention can satisfactorily be practiced at temperatures in the range from 0° F. to 500° F. with preferred temperatures being in the range from 60° F. to 90° F. Generally, the pressure can be either subatmospheric, or superatmospheric depending upon the characteristics of the system. For example, the pressure can be within the range of 0.5 atmosphere to 100 atmospheres but preferably will be in the range from atmospheric to 15 atmospheres. The space velocity may be within the range of 0.1 to 10 volume per volume per hour for both the feed rate and desorbent rate.

The silica gel employed in the practice of this invention is a well-known article of commerce having a mesh size ranging from about 14 to 350 mesh but preferably will range from 60 to 200 mesh.

The novel sorbent used in the practice of the present invention is a rubber sorbent which has been swollen with a nonaromatic solvent containing from 2 to 8 carbon atoms per molecule. Preferably, the rubber is produced from the copolymerization product of ethylene and propylene and has a mesh size ranging from 14 to 350 mesh but preferably from 60 to 200 mesh. As used herein, the term "rubber" is intended to include the cross-linked copolymer of ethylene and propylene which is substantially insoluble in the hydrocarbons of the system. The cross-linking may be obtained through vulcanization, irradiation, etc., processes which are well known to those skilled in the art. Additionally, it is distinctly preferable that the copolymerization of ethylene and propylene be carried out under conditions which favor the production of a predominantly amorphous copolymer. This procedure is well known in the art and need not be discussed here.

The solvent which is used to swell the rubber sorbent and which can be used to desorb the condensed-ring naphthenes from the sorbent can, in general, be any nonaromatic hydrocarbon. Preferably, however, the solvent is a low-molecular-weight hydrocarbon having from 2 to 8 carbon atoms per molecule. Nonlimiting examples of suitable solvents include ethane, ethylene, propane, propylene, butane, butylene, pentane, pentene, hexane, hexene, heptane, heptene, etc., mixtures thereof, polymer gasoline ($C_6$–$C_7$ olefins), petroleum ether, isopentane, isobutane, cyclopropane, cyclopentane, cyclohexane, methylcyclopentene, methylcyclohexane, and the like. It is distinctly preferable that the solvent be selected from low-molecular-weight alkanes and cycloalkanes.

The process of the invention can be carried out either as a batch process or a continuous process.

In one specific embodiment, the predominantly saturated lubricating oil fraction obtained from any source is treated batchwise by passing the charge material into a stationary column containing rubber sorbent which had been swollen by adding thereto a suitable swelling agent, i.e., solvent, until the capacity of the sorbent for condensed-ring naphthenes had been at least partially exhausted. This determination is usually made by a refractive index (R.I.) determination on the solvent-free oil in the effluent. When the R.I. reaches a certain predetermined value, this is the cut point, and feed to the bed is stopped. The desorbing agent (solvent) is then passed through the bed of solid sorbent containing the condensed-ring naphthenes sorbed thereon to desorb these naphthenes. After the recovery of the condensed-ring naphthenes, the solvent-swollen-rubber sorbent can then be reused for treating further portions of the lubricating oil feed stock.

In another specific embodiment, the feed stock is treated in a continuous process by utilizing the solvent-swollen-rubber sorbent in the form of a moving bed. The rubber sorbent is introduced into the sorption zone and is passed through in the form of a moving bed. A stream of predominantly saturated mineral oil of lubricating oil viscosity is continuously fed into the sorption zone. The rubber sorbent, containing the condensed-ring naphthenes sorbed thereon, is then introduced into a desorption zone and therein treated with a suitable desorbing solvent to displace the naphthenes. The treated rubber sorbent is then returned to the sorption zone. The recovered components are suitably separated from the solvent, as by distillation.

As a general rule, the practice of these specific embodiments does not require that the charge stock be diluted for ease of handling. However, if desired, the charge stock may be diluted with any suitable diluent; but preferably the same material which is used as the desorbing agent should be used.

As used herein, the term "paraffinic-type hydrocarbons" is intended to include paraffinic hydrocarbons and single-ring naphthenic hydrocarbons. The term "naphthenic-type hydrocarbons" is intended to include condensed-ring naphthenic hydrocarbons.

The following examples illustrate the practice of one embodiment of the present invention:

Example 1

A rubber was made from the copolymer of ethylene and propylene in the following manner: 100 parts by weight of copolymer was admixed with 1 part zinc oxide, 50 parts carbon black, 2–4 parts dicumyl peroxide, and about 1 part stearic acid. This mixture was milled for 20–40 minutes at a temperature between 80–150° F. The milled product was then formed into sheets of about 0.1 inch thick. The sheet was cured at 300° F. to 325° F. for about 20 to 60 minutes. After curing, the sheet was dipped in water for cooling.

The cured rubber was shredded into small particles of from 14 to 100 mesh (similar to a powder).

A column was made up containing 137 grams of dry rubber. The rubber was saturated with n-pentane for a period of 5 to 10 minutes until the rubber had swollen. Before charging the column, the excess n-pentane was drained off. The column was charged with 30 milliliters of saturates obtained from a lubricating oil distillate fraction boiling between 650° F. and 850° F. The effluent streams were collected as multiple fractions with the sorbed material being eluted with n-pentane. The following results were obtained:

| Oil | Solvent-free Oil Volume, ml. | Refractive Index, $N_D^{20°}$ Oil | $R_N$[1] | V.I.[2] |
|---|---|---|---|---|
| Charge | | 1.4689 | 1.7 | 99 |
| Cut 1 | 2.6 | 1.4597 | 0.4 | |
| Cut 2 | 3.0 | 1.4626 | 1.1 | 109 |
| Cut 3 | 4.3 | 1.4646 | 1.4 | |
| Cut 4 | 2.4 | 1.4665 | 1.5 | |
| Cut 5 | 4.3 | 1.4685 | 1.7 | |
| Cut 6 | 1.9 | 1.4703 | 2.1 | |
| Cut 7 | 2.4 | 1.4716 | 2.0 | 93 |
| Cut 8 | 2.1 | 1.4737 | 2.2 | |
| Cut 9 | 2.6 | 1.4794 | 2.5 | |
| Cut 10 | 0.5 | 1.4926 | >2.5 | |

[1] Average number of rings per molecule.
[2] Viscosity index.

The above results clearly show that the condensed or multi-ring naphthenes are more soluble in the swollen rubber than paraffins and monocyclo paraffins (single-ring naphthenes).

Example 2

The rubber sorbent produced in Example 1 was swollen with pentene-2 and again placed in a 1-inch-diameter column in the form of a packed bed with a height of 19 inches. Ten cubic centimeters of a saturated distillate lubricating oil fraction boiling between 700° F. and 725° F. was placed into the column. The column was eluted with pentene-2 and the effluent streams collected and stripped of solvent. The following data was obtained on the oil fractions:

| Oil | Refractive Index, $N_D^{20°}$ Oil | $R_N$[1] | V.I.[2] |
|---|---|---|---|
| Charge | 1.4672 | 1.56 | 94 |
| Cut 2 | 1.4577 | | |
| Cut 3 | 1.4605 | 0.97 | 103 |
| Cut 4 | 1.4634 | 1.24 | |
| Cut 5 | 1.4664 | 1.42 | 98 |
| Cut 6 | 1.4680 | 1.67 | |
| Cut 7 | 1.4717 | 1.81 | |
| Cut 8 | 1.4765 | | 90 |
| Cut 9 | 1.4794 | | |
| Cut 10 | 1.4833 | | |

[1] Average number of rings per molecule.
[2] Viscosity index.

These results again show that the condensed-ring naphthenes are more easily sorbed on the swollen polymer than the paraffins and single-ring naphthenes, even though the swelling agent and the elutant were olefin hydrocarbons rather than paraffinic hydrocarbons.

Example 3

The experiment of Example 2 was repeated with a 675° F. to 700° F. boiling range saturate fraction except that polymer gasoline ($C_6$–$C_7$ olefins) was used to swell the rubber and n-pentane was used to elute the fractions. Substantially the same kind of separation was obtained as illustrated in Example 2.

Therefore, from the hereinabove description the present invention involves a process for producing high-viscosity-index lubricating oil from a mineral oil fraction of lubricating oil viscosity containing condensed-ring naphthenic hydrocarbons in admixture with paraffinic and single-ring naphthenic hydrocarbons in which the condensed-ring naphthenic hydrocarbons are removed and a lubricating oil of substantially improved viscosity index containing mainly paraffinic and single-ring naphthenic hydrocarbons is recovered.

I claim:

1. A cyclic process for separating saturated hydrocarbons selected from the group consisting of paraffinic hydrocarbons and single-ring naphthenic hydrocarbons from condensed-ring naphthenic hydrocarbons which comprises contacting in a first cycle a dearomatized petroleum lubricating oil fraction boiling in excess of 300° F. with a cross-linked ethylene-propylene copolymer rubber sorbent swollen with a nonaromatic hydrocarbon solvent containing from 2 to 8 carbon atoms per molecule, recovering a first effluent stream composed mainly of paraffinic-type hydrocarbons selected from the group consisting of paraffinic hydrocarbons and single-ring naphthenic hydrocarbons, contacting said rubber sorbent in a second cycle with desorbing agent, and recovering a second effluent stream composed mainly of condensed-ring naphthenic hydrocarbons.

2. A cyclic process according to claim 1 wherein said solvent is pentene-2.

3. A cyclic process according to claim 1 wherein said solvent is selected from the group consisting of alkanes and cycloalkanes.

4. A cyclic process for separating a substantially saturated petroleum lubricating oil fraction into relatively high-viscosity-index components and relatively low-viscosity-index components which comprises:

(a) contacting said fraction in a first cycle with rubber sorbent comprising the cross-linked copolymerization product of ethylene and propylene swollen with a nonaromatic hydrocarbon solvent containing from 2 to 8 carbon atoms per molecule, at a temperature between 0° F. and 300° F., a pressure between 0.5 atmosphere and 100 atmospheres, and a liquid hourly space velocity between 0.1 and 10;

(b) recovering from said sorbent a first effluent stream containing relatively high-viscosity-index components;

(c) contacting said sorbent in a second cycle with a nonaromatic hydrocarbon solvent selected from the group consisting of alkanes and cycloalkanes at a temperature between 0° F. and 300° F., a pressure between 0.5 atmosphere and 100 atmospheres, and a liquid hourly space velocity between 0.1 and 10; and (d) recovering from said sorbent a second effluent stream containing relatively low-viscosity-index components.

References Cited by the Examiner

UNITED STATES PATENTS

| | | | |
|---|---|---|---|
| 2,643,217 | 6/53 | Watson et al. | 260—676 |
| 2,726,986 | 12/55 | Gross | 208—337 |
| 2,754,254 | 7/56 | Hastings et al. | 260—674 |
| 2,756,197 | 7/56 | Thorpe et al. | 260—676 |
| 2,960,462 | 11/60 | Lee et al. | 208—308 |
| 2,974,178 | 3/61 | Hwa et al. | 260—708 |

ALPHONSO D. SULLIVAN, *Primary Examiner.*